(12) United States Patent
Featherstone

(10) Patent No.: US 6,353,695 B1
(45) Date of Patent: Mar. 5, 2002

(54) METHOD AND APPARATUS FOR JOINING UNDERWATER CABLE

(75) Inventor: Jeremy John Richard Featherstone, Chelmsford Essex (GB)

(73) Assignee: Global Marine Systems Limited, Chelmsford (GB)

( * ) Notice: Subject to any disclaimer, the term of this patent is extended or adjusted under 35 U.S.C. 154(b) by 0 days.

(21) Appl. No.: 09/410,103

(22) Filed: Oct. 1, 1999

Related U.S. Application Data

(63) Continuation of application No. PCT/GB98/00979, filed on Apr. 2, 1998.

(30) Foreign Application Priority Data

Apr. 3, 1997 (GB) .............................................. 9706729

(51) Int. Cl.[7] ............................. G02B 6/255; G02B 6/44
(52) U.S. Cl. ........................................ 385/100; 385/99
(58) Field of Search ............................ 385/100, 99, 47, 385/136, 59, 137, 53; 174/88; 439/275; 405/170

(56) References Cited

U.S. PATENT DOCUMENTS

| 4,479,690 A | * 10/1984 | Inouye et al. ............... 439/275 |
| 4,493,590 A | * 1/1985 | Ayers et al. ................. 405/170 |
| 4,763,978 A | * 8/1988 | Courtney-Pratt et al. ..... 385/47 |
| 4,778,948 A | * 10/1988 | Fitch et al. .................... 174/88 |
| 5,037,177 A | * 8/1991 | Brown et al. ................. 385/59 |

FOREIGN PATENT DOCUMENTS

| EP | 0 065 178 | 11/1982 | ............. 385/100 X |
| JP | 57-130008 | 8/1982 | ............. 385/100 X |
| JP | 63305710 | * 12/1988 | ................ 405/173 |
| JP | 6-186345 | 7/1994 | ............. 385/100 X |

OTHER PUBLICATIONS

Patent Abstracts of Japan vol. 007, No. 018 (P–170), Jan. 25, 1983 & JP 57 172303 A ( Nippon Denshin Denwa Kosha ), Oct. 23, 1982.
Patent Abstracts of Japan vol. 013, No. 144 ( E–740 ), Apr. 10, 1989 & JP 63 305710 A ( Nippon Telegr. & Teleph Corp ), Dec. 13, 1988.

* cited by examiner

*Primary Examiner*—Brian Healy
*Assistant Examiner*—Scott Knauss
(74) *Attorney, Agent, or Firm*—Pillsbury Winthrop LLP

(57) ABSTRACT

A method of joining and deploying two or more lengths (63,64) of underwater cable the method comprising (1) connecting together and securing the lengths of cable in cable joint (65) whereby each length of cable extends from a cable reception region (3) on one side of the cable joint, (2) attaching a deployment device (66) to the joint, (3) lowering the cable joint using the attached deployment device (66); and (4) releasing the attached deployment device (66). The cable joint can be lowered by a single deployment device only, and each length of the cable is under tension up to the cable joint when the cable joint is lowered.

17 Claims, 8 Drawing Sheets

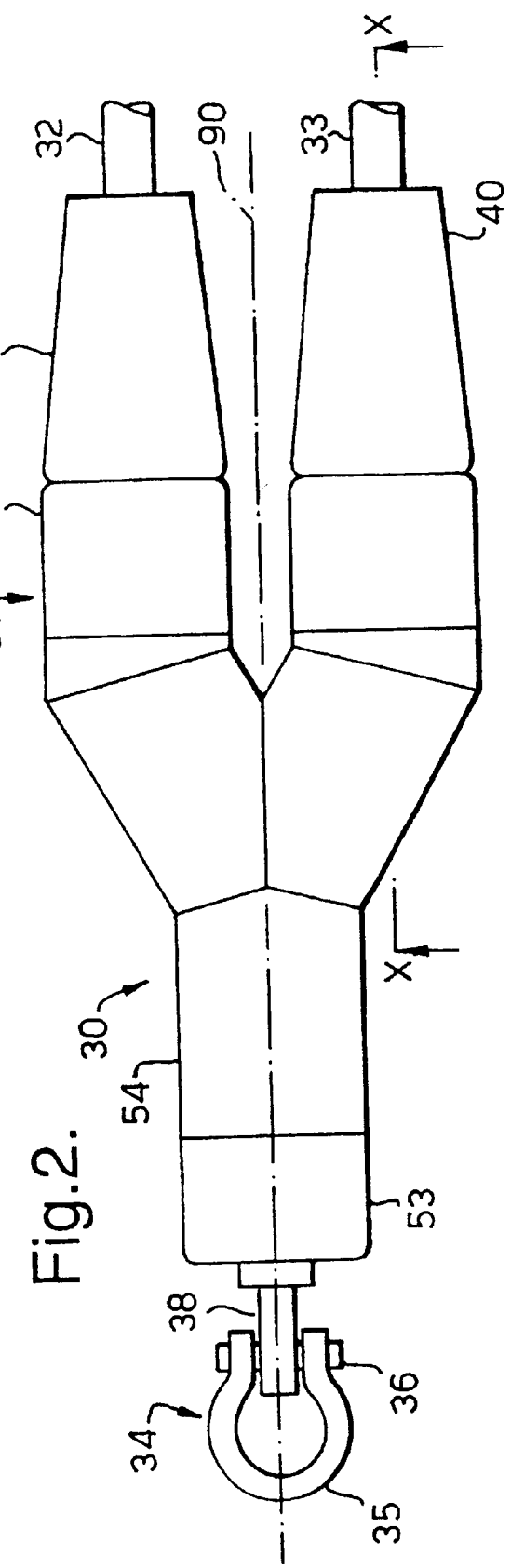
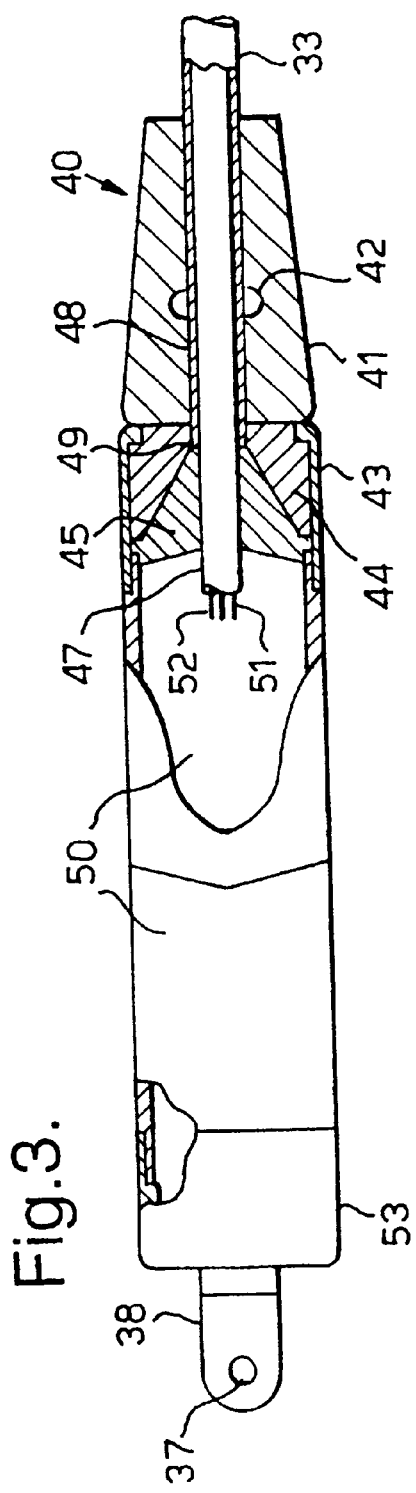
Fig.2.
Fig.3.

METHOD AND APPARATUS FOR JOINING UNDERWATER CABLE

This is a Continuation of International Appln. No. PCT/GB98/00979 filed Apr. 2, 1998 pending.

The present invention relates to an underwater cable joint and to a method of joining and deploying two or more lengths of underwater cable.

A conventional method of repairing a damaged underwater optical fibre cable is illustrated in FIGS. 1a–1g. The cable 1 has previously been installed on a seabed 2. In FIG. 1a the cable 1 is lying on top of the seabed 2 but in practice the cable 1 may be buried. The cable 1 has developed a fault 3. The approximate location of the fault 3 is determined previously by a known technique (for instance optical or electrical reflectrometry) before a cable repair ship 4 is sent to repair the damaged cable.

When the ship 4 has reached the approximate location of the fault 3, a cable severing grapnel 5 is deployed via overboard sheave 23 to sever the cable 1. This separates the cable 1 into a first length 6 (containing the fault 3) and a second length 7.

Referring to FIG. 1b, a retrieval grapnel 8 is deployed to retrieve the end 9 of one of the lengths of severed cable (in this case the second length 7) onto the deck of the ship 4. The retrieved length of the cable is tested to determine whether it contains the fault. In this case, the second length 7 does not contain the fault 3, and therefore the second length 7 of the cable is buoyed off using a buoy 10 (FIG. 1c). The retrieval grapnel 8 is used to retrieve the other length of the cable (in this case the first length) as illustrated in FIG. 1c.

The cable repair ship 4 pulls in the first length 6 of the cable until the fault 3 is on the deck of the ship as shown in FIG. 1d. The exact location of the fault 3 may be determined using reflectrometry or may be clearly visible (for instance the outer casing of the cable may have been visibly damaged by a ship's anchor or fishing gear). Once the fault 3 is on the deck of the ship, the section of cable containing the fault 3 is cut out by cutting the first length 6 of the cable at a location 11 on the sea side of the fault 3.

As illustrated in FIG. 1e, the damaged section of cable is replaced by a third length 12 of cable which is joined to the first length 6 of the cable using a conventional inline cable joint 13.

The first length 6 and third length 12 of the cable are then paid out until the cable retrieval ship 4 has returned to the buoy 10. The buoy 10 is retrieved and the second length 7 of the cable is brought onto the deck of the ship as indicated in FIG. 1f At this stage, the third length 12 of the cable is cut at a suitable position 14 and the free end of the third length 12 of cable is joined to the end 15 of the second length 7 of the cable via a conventional inline joint 16 (shown in FIG. 1g). The inline joint 16 is known as a "final splice joint".

The final splice joint 16 is deployed as illustrated in FIG. 1g. It is not possible to lower the cable on a single deployment rope since this would cause the cable at the point of attachment to bend beyond a minimum bend radius and damage the cable. Therefore two deployment ropes 17,18 are used to create a loop having a crown 21 of sufficiently low curvature. The deployment ropes 17,18 are attached to the cable via a pair of suitably spaced stoppers 19,20. The cable is lowered overboard using the deployment ropes 17,18 and at a suitable point the deployment ropes 17,18 are released, either by cutting the ropes 17,18 at the ship or by releasing the ropes at the stoppers by actuating a release hook (e.g. an acoustic release hook) Depending on the depth of the water the deployment ropes may be released before the cable has reached the seabed, and may even be released before the stoppers have reached the water.

A similar method of lowering a jointed cable may be employed in a conventional method of installing a cable on an underwater bed between two land masses.

In one example, separate lengths of the cable are first installed in the shallow water near the two respective land masses. The two shallow water lengths of cable are then buoyed. An installation ship joins a third length of cable to one of the shallow water lengths of cable, installs the third length of cable in the deep water between the two land masses, joins the third length of cable to the other shallow water length of cable, and lowers the joined lengths as shown in FIG. 1g.

In a second example a first length of the cable is installed from one land mass to a point mid-way between the land masses, and then buoyed off. A second length of cable is then installed from the other land mass until the buoyed-off end of the first length of cable has been located. The first and second lengths are then joined and lowered as shown in FIG. 1g. Alternatively the first and second lengths may be joined before the second length of cable is installed. In this case the cable joint is simply paid off via the overboard sheave as the second length of cable is installed.

The method of deploying the cable illustrated in FIG. 1g has a number of problems.

Firstly the cable tends to develop loops as it returns to the seabed. This problem is illustrated in FIGS. 7 and 8 which are plan views of a cable on the seabed which has been lowered according to FIG. 1g. FIG. 7 shows an ideal configuration which is rarely achieved in practice. As the cable is lowered (FIG. 1g), the ship 4 steams away from the line of the cable in the direction indicated at 24 in FIG. 7. The aim is to ensure that the additional length of cable (which is required due to the depth of the water) forms a single untwisted loop 25 which can be relatively easily reburied. However in practice the cable often tends to develop loops and twists as it is lowered on the deployment ropes 17,18 (due to twisting of the deployment ropes and looping of the crown 21 which is not under tension). In addition the cable develops further loops and twists as the cable falls if the deployment ropes are released before the stoppers have reached the seabed. As a result, the cable tends to end up in a configuration of the type shown in FIG. 8. Instead of lying as a single untwisted loop 25, the cable develops a number of untwisted loops 26,27 and twisted loops 28,29 which are difficult or impossible to rebury.

Secondly, if the deployment ropes are released by cutting them onboard the ship then the ropes are left on the seabed attached to the cable via the stoppers 19,20. If the deployment ropes 17,18 are later caught by a ship's anchor or fishing gear then the cable can be damaged. To avoid this problem it is common practice to send a Remotely operated Vehicle (ROV) down to the seabed after the cable has been lowered to cut the deployment ropes 17,18 from the cable. This adds cost and complexity to the deployment operation.

Thirdly the requirement of two deployment ropes increases the operational complexity of the deployment operation. In some cases, additional deployment ropes may be attached to the cable between the stoppers 19,20 to increase the tension on the crown 21 and reduce looping. This increases the complexity of the lowering operation further and increases the number of deployment ropes which must be released and/or cut by an ROV.

Fourthly it may be difficult to achieve sufficient spread at the ship between the deployment ropes 17,18. This is a particular problem where there is limited width available on the deck of the ship (such as on bow-working ships).

In accordance with a first aspect of the present invention there is provided a method of joining and deploying two or more lengths of underwater cable the method comprising (1) connecting together and securing the lengths of cable in a cable joint whereby each length of cable extends from a cable reception region on one side of the cable joint;
(2) attaching a deployment device to the cable joint;
(3) lowering the cable joint using the attached deployment device; and
(4) releasing the attached deployment device.

In accordance with a second aspect of the present invention there is provided an underwater cable joint comprising a housing having a cable reception region on one side for receiving two or more lengths of cable to be joined to each other; means for retaining the cables in the housing; and a hook or eye for attaching a retrieval/deployment device to the joint.

In accordance with a third aspect of the present invention there is provided an underwater cable joint comprising a housing defining a chamber having one or more openings on one side, wherein the one or more openings define a cable reception region for receiving two or more lengths of cable to be joined to each other; means for retaining the cables in the chamber; and attachment means on a closed side of the chamber for attaching a retrieval/deployment device to the joint for deployment or retrieval of the joint.

The invention solves the problem of seabed loops by keeping the two lengths of cable in tension as the joint is lowered, hence preventing the loops from forming.

It is also possible to lower the cable using a single deployment device only. This reduces the number of deployment ropes which need to be released, and simplifies the lowering operation.

Load is transmitted substantially axially to the lengths of cable through the joint. This results in two advantages. Firstly the cable can be lowered by attaching a deployment device to the joint without causing excessive curvature in the cable. Secondly, the cable is less likely to be damaged if a deployment rope (which has been used to lower the joint and is then cut at the ship) is caught by an anchor or fishing gear.

The cable may comprise any underwater cable such as a power cable. Typically the cable comprises a telecommunications cable such as an optical fibre cable. The joint may also be used to connect two or more lengths of pipe containing fluid (typically a low flow pipe such as a hydraulic control pipe which may also contain electrical control cables). Therefore the word "cables" in the present specification should be construed to include any elongate member.

Typically the joint has a cable reception region on one side only (i.e. cables only extend from one side of the joint).

The attachment means may be located at any point on the joint but preferably the attachment means is opposite the cable reception region. For instance if the joint is used to connect two cable lengths the joint may be Y-shaped. This ensures that each length of cable is subjected to substantially axial force as it is lowered.

The cable reception region is typically adapted to receive the lengths of cable such that they extend from the same side of the joint in parallel, or diverge by an angle of up to 60°. In one example the cable reception region comprises two or more arms which each receive a respective length of cable and diverge by up to 60°. The optimum angle of divergence will depend upon a number of factors, including the depth of the water and the width of the overboard sheave on the ship which deploys the joint. In one example the lengths of cable are parallel, and in another example the lengths of cable diverge by 10°.

Typically the means for retaining the cables comprises a pair of wedges (or any other wire retaining mechanism) which grip an outer armoured portion of the cable. In addition the joint may be moulded to the sheath of the cable.

The hook or eye may be of any suitable form which enables a deployment device to be secured to the joint. In a preferred embodiment the hook or eye comprises a shackle. The deployment device may comprise a single rope with a loop or automatic release hook at one end which is secured to the hook or eye. Alternatively a slip rope may be passed through the eye or hook and held at both ends on the ship.

Typically the joint is used to connect two lengths of cable only. Alternatively the joint may be used to connect three or more lengths of cable. In this case the joint is typically used as a branching unit in which a single length of cable is split into two or more cables. For instance where the cable is a telecommunications cable such as a fibre-optic cable, a bundle of optical fibres in a first length of cable is split in the branching unit into two or more bundles which each exit via a respective one of the other lengths of cable.

The method of the present invention may be employed in a variety of procedures including cable repair and cable installation.

In accordance with a fourth aspect of the present invention there is provided a method of repairing an underwater cable, the method comprising (1) severing the cable to separate first and second lengths of the cable;
(2) retrieving the cable from underwater;
(3) repairing the first length of the cable;
(4) joining and deploying the first and second lengths of the cable by a method according to the first aspect of the present invention.

The cable may be retrieved in step (2) before or after it is severed in step (1).

Typically the first length of cable is repaired in step (3) by cutting out a section of the first length of the cable including a fault. In shallow water, if the cut out section of cable is small and the cable is slack, then it may be possible to connect the first and second lengths directly. Typically however a third length of cable is joined to the first length of cable to replace the cut out section and to allow the lengths of cable to be joined (taking into account the depth of the water). In this case the free end of the third length of cable is connected to the free end of the second length of cable.

According to a fifth aspect of the present invention there is provided a method of installing a cable on an underwater bed, the method comprising (1) laying first and second lengths of the cable on the underwater bed; and
(2) joining and deploying the first and second lengths of the cable by a method according to the fifth aspect of the present invention.

The first and second lengths of cable may be laid before or after they are joined.

Where it is necessary to join three or more lengths of cable (for instance at a branching unit) then the method further comprises laying one or more further lengths of cable on the underwater bed; and joining and deploying the first, second and one or more further lengths of the cable by a method according to the first aspect of the present invention.

The attachment means provides a convenient point for retrieval of the cable if it is necessary to retrieve the cable after it has been lowered. Therefore according to a sixth aspect of the present invention there is provided a method of retrieving an underwater cable comprising (1) locating a cable joint according to the second or third aspect of the present invention which joins two or more lengths of the cable;

(2) attaching a retrieval device to the attachment means on the located cable joint; and (3) retrieving the cable using the attached retrieval device.

The retrieval device typically comprises a device (such as a hook) on a Remotely Operated Vehicle (ROV).

A number of embodiments of the present invention will now be described with reference to the accompanying drawings, in which:

FIGS. 1a–1g illustrate a conventional method of repairing an underwater cable; in which FIG. 1a illustrates the deployment of a cable severing grapnel;

FIG. 1b illustrates the retrieval of a second length of the severed cable;

FIG. 1c illustrates the retrieval of a first length of the severed cable;

FIG. 1d illustrates the cable repair ship pulling in the first length of cable;

FIG. 1e illustrates the replacement of the damaged section of the cable with a third length of cable;

FIG. 1f shows the second and third lengths of cable on the deck of the ship before jointing; and FIG. 1g illustrates the deployment of the repaired cable;

FIG. 2 is a plan view of a first example of an underwater cable joint according to the present invention including two joined cables;

FIG. 3 is a side view of the joint of FIG. 1 in section along the line X—X;

FIGS. 4a–4c illustrate an example of a method of joining and deploying two lengths of underwater cable according to the second aspect of the present invention; in which FIG. 4a illustrates two lengths of cable with their ends on the deck of a ship before jointing;

FIG. 4b illustrates the two lengths of cable after jointing with a cable joint according to the first aspect of the present invention; and FIG. 4c illustrates the deployment of the cable joint;

FIGS. 7–9 are plan views of a deployed jointed cable; in which

FIG. 7 shows an ideal configuration;

FIG. 8 shows a typical looped configuration which results in practice; and

FIG. 9 shows the configuration which is achieved by the method according to the present invention.

Figure 1A:
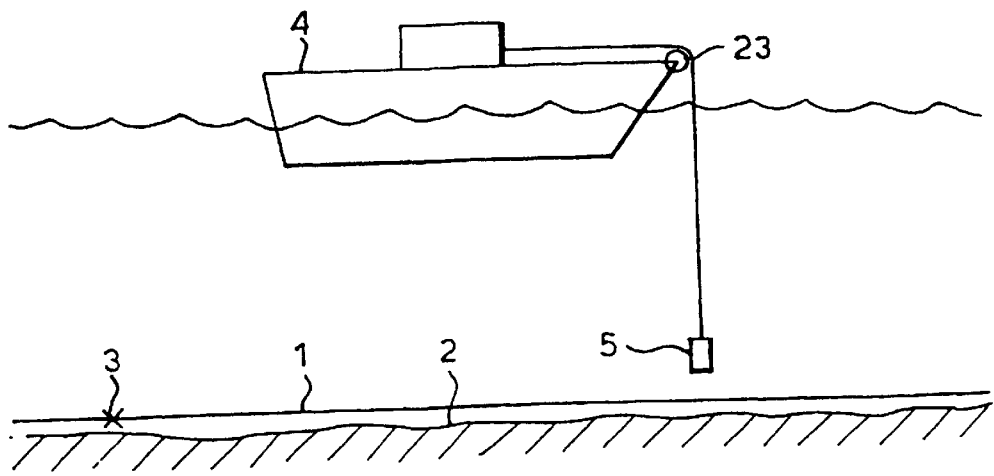
Figure 1B:
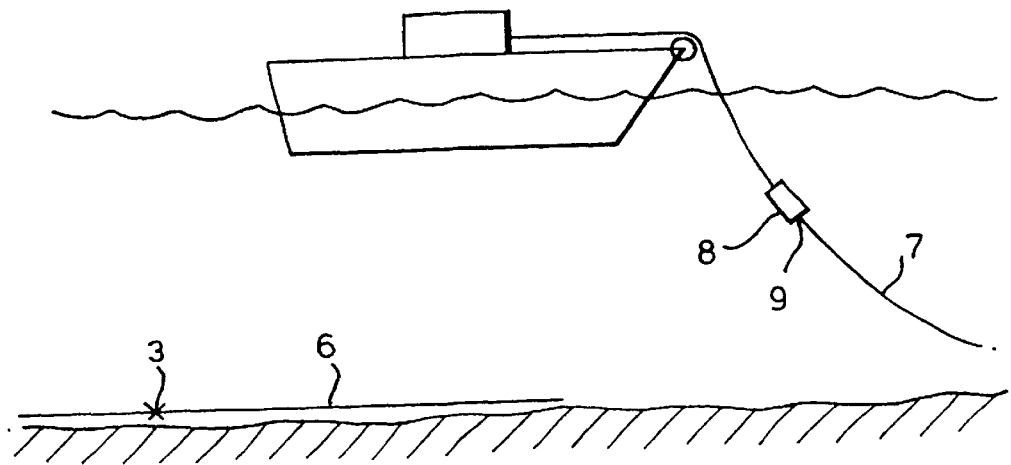
Figure 1C:
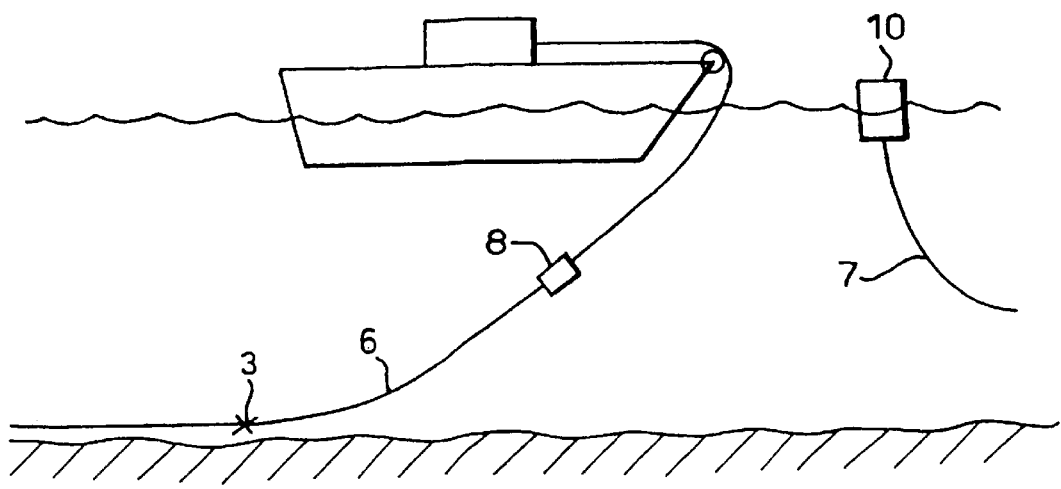
Figure 1D:
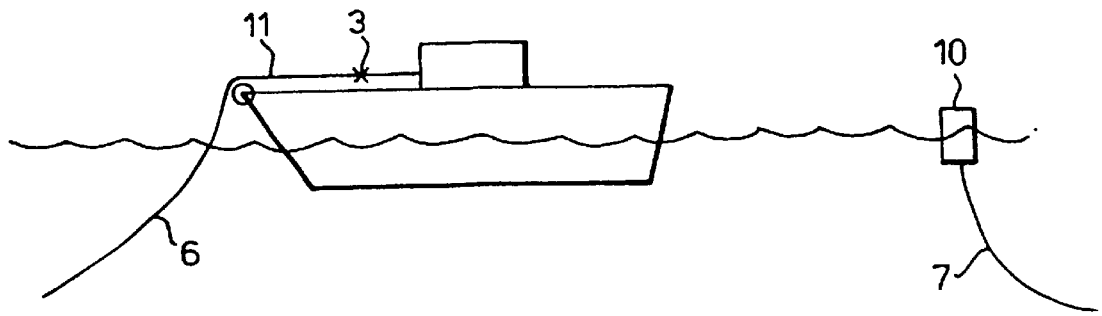
Figure 1D:
Figure 1E:
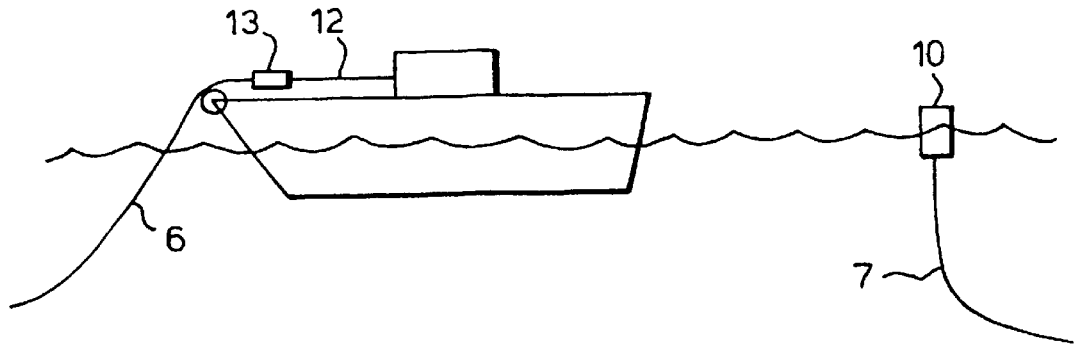
Figure 1F:
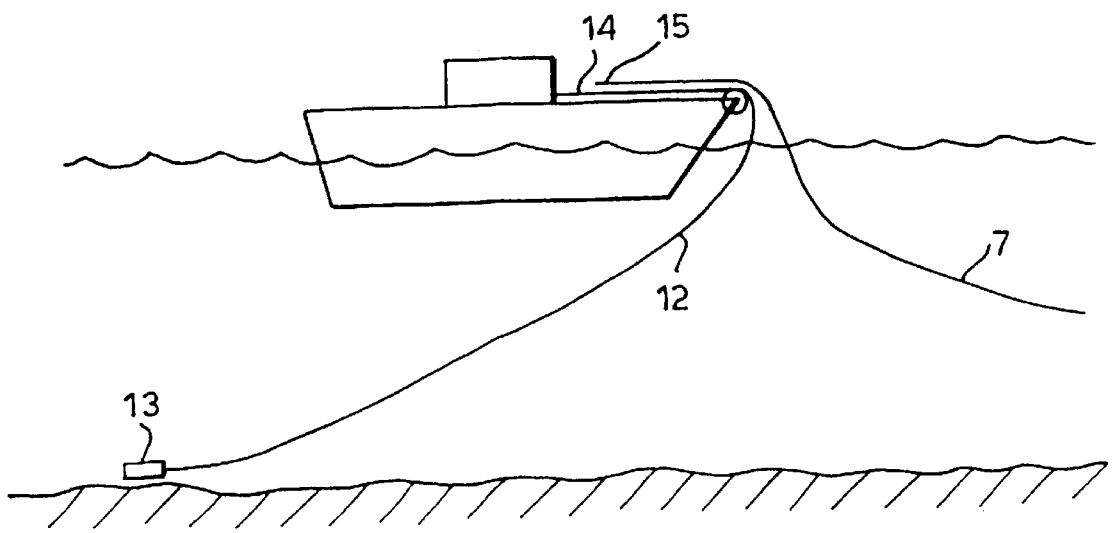
Figure 1G:
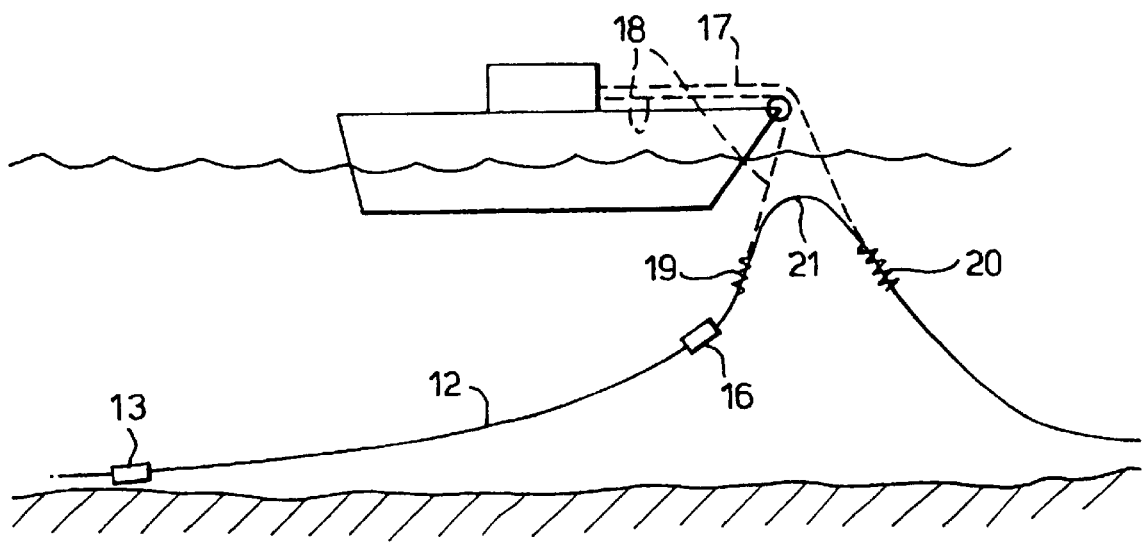

Referring to FIGS. 2 and 3, a first example of a cable joint according to the present invention comprises a housing 30 having a cable reception region 31 on one side for receiving two lengths of cable 32,33 to be joined to each other, and a shackle 34 opposite the cable reception region 31 for attaching a retrieval/deployment device to the joint for deployment or retrieval of the joint.

The shackle 34 is mounted on a removable end cap 53. The outer casing of the housing comprises a pressure resistant sleeve 54.

The shackle 34 comprises a clevis 35 and shackle pin 36 which is retained in an eye 37 of an attachment lug 38.

The joint is Y-shaped and has a first arm 39 for receiving the first length of cable 32 and a second arm 40 for receiving the second length of cable 33. Each arm 39,40 is identical and the second arm 40 is shown in section in FIG. 2. The arm 40 comprises a moulded tail 41, cable collar 42, end cap 43 and inner and outer armour wedges 44,45. The arms 39,40 may each further comprise an armadillo bend limiter (not shown) of the type described in GB-B-2142788. The bend limiter provides strength in bending and maintenance of minimum bend radius.

The arms 39,40 may have different lengths. The arms 39,40 may be constructed differently if the lengths of cable to be joined have a different construction. In addition the arms 39,40 may have a different diameter if the lengths of cable to be joined have a different diameter. The arms 39,40 are parallel, but in an alternative the arms may diverge by 10° (i.e. each arm extending at an angle of 5° to the centre line 90) In general the arms may diverge by up to 60°.

The cable 33 comprises an inner core 47 carrying a bundle of optical fibres 51 and electrical wiring 52, and an outer armouring layer 48. The outer armouring layer 48 is separated from the inner core at 49 and gripped between the inner and outer armour wedges 44,45 to secure the cable.

The optical fibre bundle 51 and electrical wires 52 extend into a jointing chamber 50 where they are connected to the optical fibres and electrical wires of the second length of cable 32.

In order to connect the two lengths of cable, their free ends are inserted into arms 39, 40 and their armour layers are secured between the respective inner and outer armour wedges. The end cap 53 and shackle 34 are removed from the joint, leaving an open end through which the electrical wires 52 and optical fibres 51 extend. The electrical wires 52 and optical fibres 51 are then connected together outside the jointing chamber 50. After they have been connected together, the electrical wires 52 and optical fibres 51 are returned to the jointing chamber 50 and the end cap 53 and shackle 34 are attached.

Figure 4A:
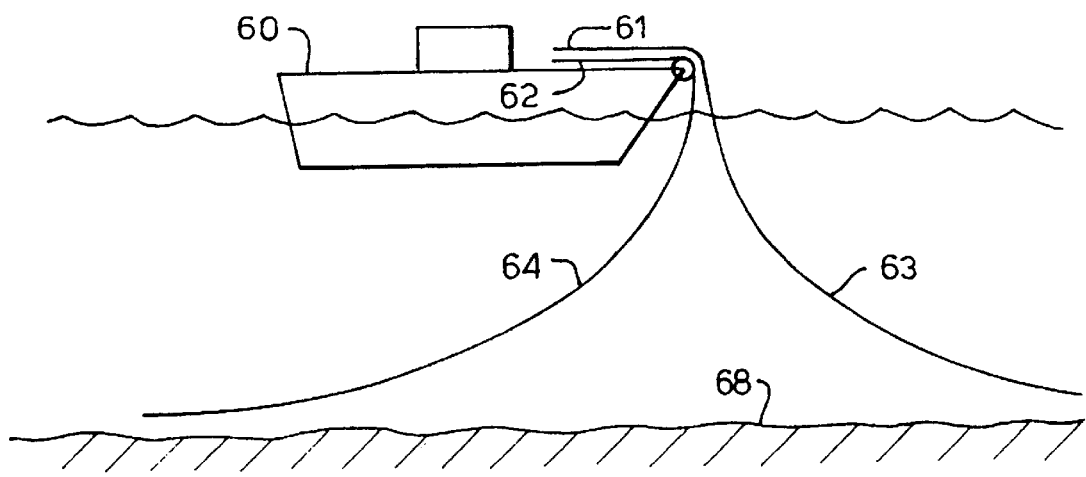
Figure 4B:
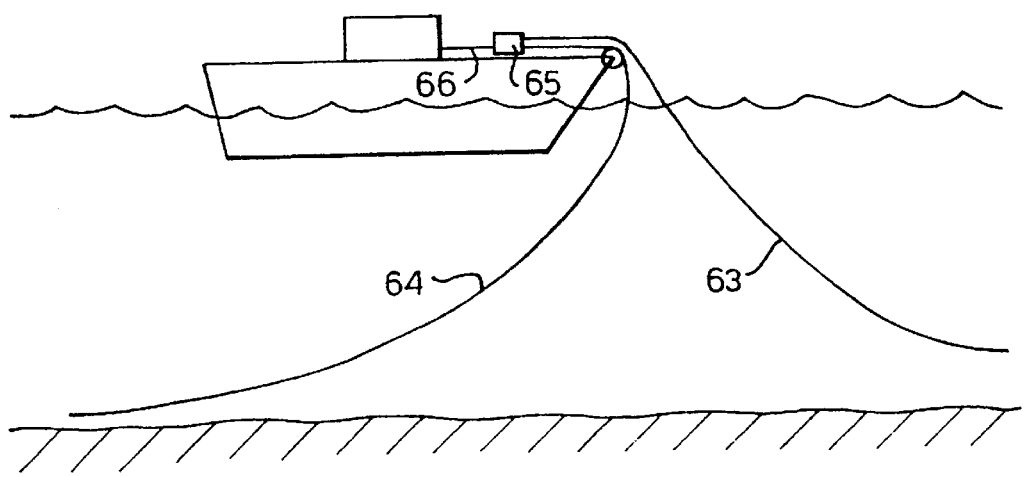
Figure 4C:
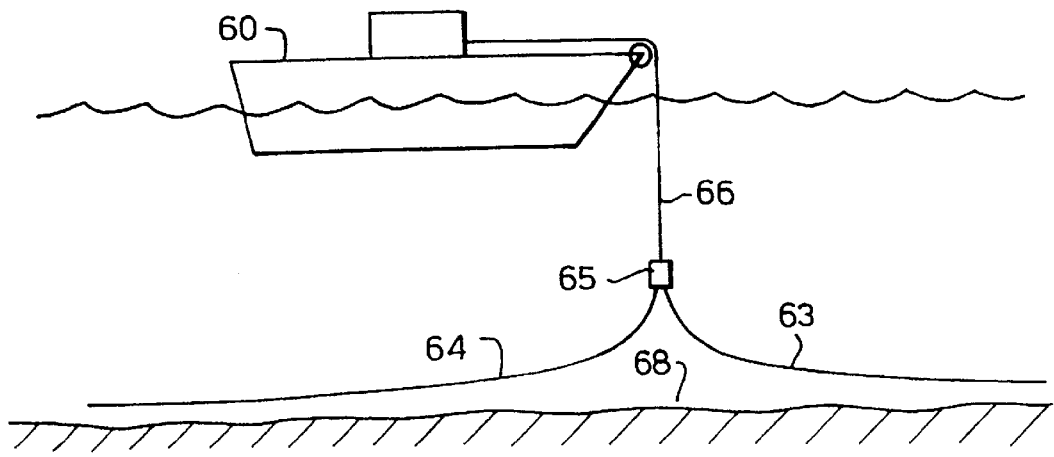

FIGS. 4a–4c illustrate an example of a method of joining and deploying two lengths of underwater cable using the joint of FIGS. 2 and 3. A cable ship 60 carries the free ends 61,62 of first 63 and second 64 lengths of cable. The first and second lengths of cable are connected together and secured in a cable joint 65 constructed according to FIGS. 2 and 3. A deployment rope 66 is attached to shackle 34. The joint 65 is then lowered over the bow of the ship using the single deployment rope 66 only as shown in FIG. 4c. As can be seen in FIG. 4c, no crown is formed.

Once the joint 65 has been lowered sufficiently, the deployment rope 66 is released. This may be achieved by cutting the rope 66, or by actuating an automatic release hook. In a further alternative the single deployment rope 66 may be replaced by a single slip loop which passes through the shackle 34 and has both ends held on the ship. To release the joint, one end is let go and the other pulled in, running through the shackle. The rope 66 may be released before the joint 65 has reached the seabed 68, or even before the joint has reached the water.

Figure 9:
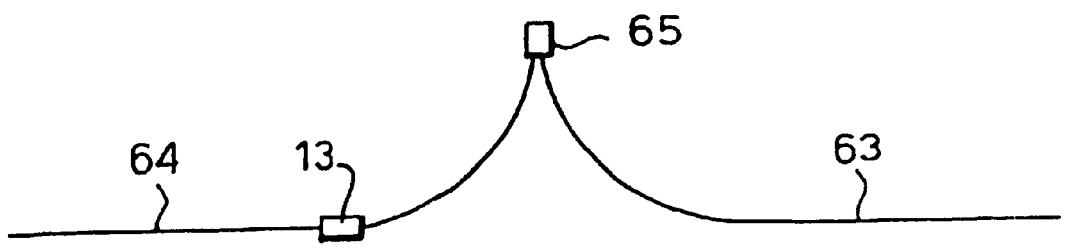

The resulting configuration of the cable on the seabed is illustrated in the plan view of FIG. 9. Since both lengths of cable 63,64 are in tension up to the cable joint 65, no loops are formed.

The method illustrated in FIGS. 4a–4c is typically employed in a method of repairing an underwater cable or in a method of installing an underwater cable.

Cable Repair

The first five steps of an example of a cable repair operation according to the present invention correspond to the conventional steps illustrated in FIGS. 1a–1e. That is, the cable on the underwater bed is cut and the two lengths of cable are retrieved onto the deck of the ship. The first length of cable is then repaired by replacing the damaged section of the cable with a third length of cable. The first/third lengths of cable and the second length of cable are then connected together and deployed as illustrated in FIGS. 4a–4c.

Cable Installation

Where the method of FIGS. 4a–4c is employed during cable installation, the second length of cable 63 is installed and buoyed off. The ship 60 installs the first length of cable 64 until it reaches the buoyed off second length of cable 63. The two lengths of cable are then connected together and deployed as illustrated in FIGS. 4a–4c. Alternatively the two lengths of cable may be connected together and deployed before the first length of cable is installed.

Figure 5:
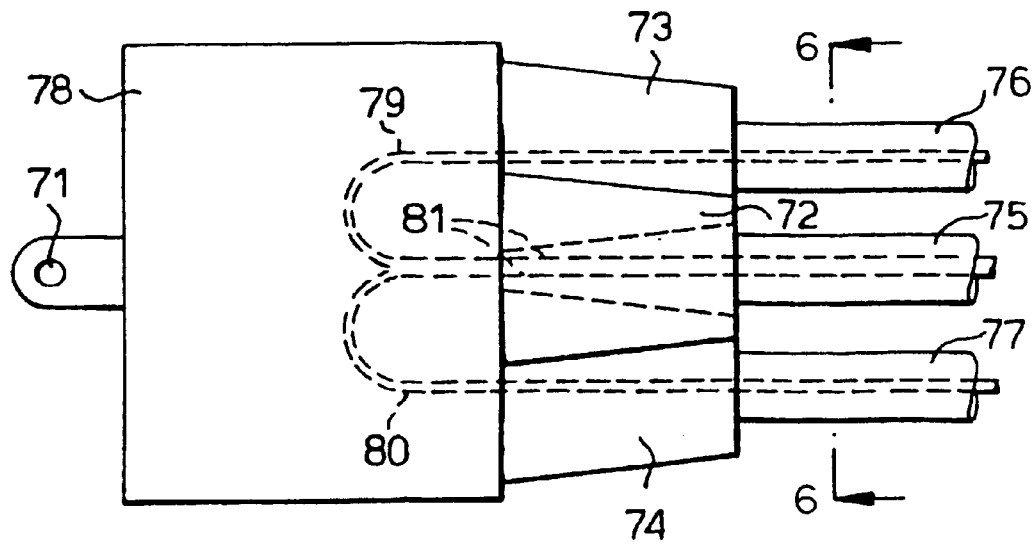
FIG. 5 is a plan view of a second example of an underwater cable joint according to the present invention.
Figure 6:
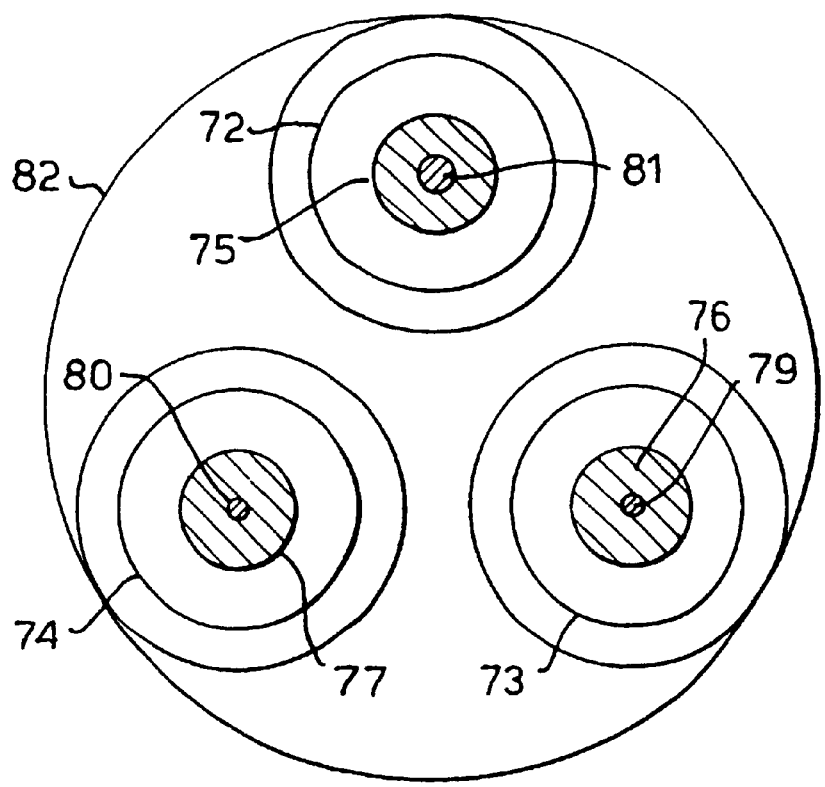
FIG. 6 is a cross-section of the joint of FIG. 5 along a line A—A.
Figure 7:
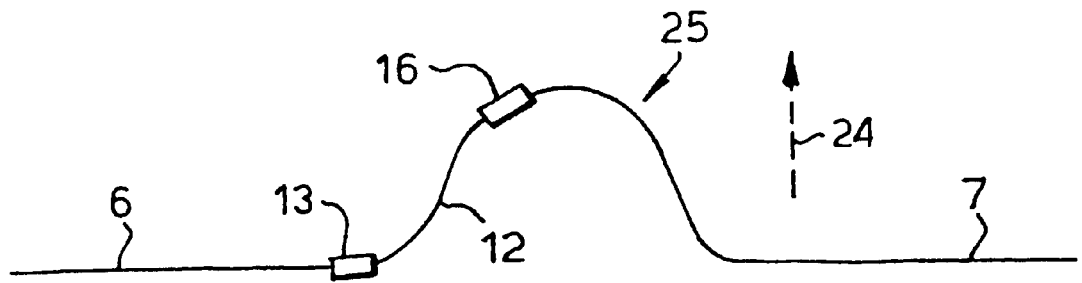
Figure 8:
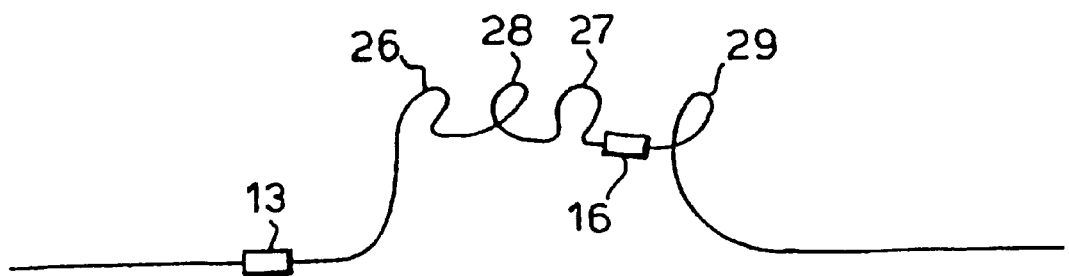

FIGS. 5 and 6 illustrate a second example of an underwater cable joint according to the present invention, in which the cable reception region receives three lengths of cable. The cable joint illustrated in FIGS. 5 and 6 is typically used as a branching unit.

The joint comprises a housing 82 having a cable reception region 70 on one side and an attachment eye 71 on the other side. The cable reception region 70 comprises three parallel equally spaced arms 72,73,74 arranged in a triangular configuration which each receive a respective length of cable 75–77. The arms 72,73,74 may further comprise armadillo bend limiters (not shown) of the type described in GB-B-2142788. The first length of cable 75 contains a bundle 81 of optical fibres which are split in a chamber 78 into a first group of fibres 79 which exit via the second length of cable 76, and a second bundle of fibres 80 which exit via the third length of cable 77.

The arms may diverge by 10°, or may diverge by up to approximately 60°.

After a cable has been installed or repaired using the joint of FIGS. 2 and 3 or the branching unit of FIGS. 5 and 6, the cable can be retrieved easily by an ROV which can attach a retrieval hook to the shackle 34,71 and lift the cable (before or after severing the cable) to the surface.

What is claimed is:

1. A method of joining and deploying two or more lengths of underwater cable, the method comprising:
   connecting together and securing the lengths of cable in a cable joint box whereby each length of cable extends from a cable reception region on one side of the cable joint box;
   attaching a deployment device to the cable joint box;
   lowering the cable joint box using the attached deployment device; and
   releasing the attached deployment device.

2. A method according to claim 1, wherein the cable joint box is lowered by a single deployment device.

3. A method according to claim 1, wherein each length of the cable is under tension up to the cable joint box when the cable joint box is lowered.

4. A method of repairing an underwater cable, the method comprising:
   serving the cable to separate first and second lengths of the cable;
   retrieving the cable from underwater;
   repairing the first length of the cable; and
   joining and deploying the first and second lengths of the cable by a method according to claim 1.

5. A method of installing a cable on an underwater bed, the method comprising:
   laying first and second lengths of the cable on the underwater bed; and
   joining and deploying the first and second lengths of the cable by a method according to claim 1.

6. A method according to claim 5, further comprising:
   laying one or more further lengths of cable on the underwater bed; and
   joining and deploying the first, second and one or more further lengths of the cable by a method according to claim 1, whereby each length of cable extends from the cable reception region on one side of the cable joint box.

7. An underwater cable joint box, comprising:
   a housing having a cable reception region on one side for receiving two or more lengths of the cable to be joined to each other;
   means for retaining the lengths of cable in the housing; and
   an attachment means for attaching a retrieval/deployment device to the joint box.

8. An underwater cable joint box, comprising:
   a housing defining a chamber having one or more openings on one side, wherein the one or more openings define a cable reception region for receiving two or more lengths of cable to be joined to each other;
   means for retaining the lengths of cable in the chamber; and
   an attachment means secured to the housing on a closed side of the chamber for attaching a retrieval/deployment device to the joint box for deployment or retrieval of the joint box.

9. A joint box according to claim 7, wherein the attachment means is one of a shackle, a hook, and an eye.

10. A joint box according to claim 7, wherein the attachment means is opposite the cable reception region.

11. A joint box according to claim 7, wherein the joint box comprises a branching unit and the cable reception region receives three or more lengths of cable.

12. A method of retrieving an underwater cable, the method comprising:
   locating a cable joint box according to claim 7 which joins two or more lengths of the cable;
   attaching a retrieval device to the attachment means on the located cable joint box; and
   retrieving the cable using the attached retrieval device.

13. An underwater cable joint assembly, comprising:
   a housing;
   two or more lengths of cable retained in the housing and each length of cable coupled to at least one of the other lengths of cable; and
   an attachment means secured to the housing for attaching a retrieval/deployment device to the joint assembly, wherein the two or more lengths of cable enter the housing from one side.

14. A joint box according to claim 8, wherein the attachment means is one of a shackle, a hook, and an eye.

15. A joint box according to claim 8, wherein the attachment means is opposite the cable reception region.

16. A joint box according to claim 8, wherein the joint box comprises a branching unit and the cable reception region receives three or more lengths of cable.

17. A joint assembly according to claim 13, wherein the attachment means is one of a shackle, a hook, and an eye.

* * * * *